United States Patent [19]

Wang

[11] Patent Number: 4,814,745

[45] Date of Patent: Mar. 21, 1989

[54] SIGNAL DEVICE FOR PNEUMATIC TIRE

[76] Inventor: Hsug-Fang Wang, No. 129, Tuan-Chu Lane, Tuan-Chu Li, Chiayi City, Taiwan

[21] Appl. No.: 209,399

[22] Filed: Jun. 21, 1988

[51] Int. Cl.4 ............................................ B60C 23/04
[52] U.S. Cl. .................................. 340/442; 73/146.8; 200/61.25
[58] Field of Search ............. 340/58; 73/146.2, 146.3, 73/146.5, 146.8; 200/61.22, 61.25

[56] References Cited

U.S. PATENT DOCUMENTS 4,726,223 2/1988 Huang .................................. 340/58

Primary Examiner—Joseph A. Orsino
Assistant Examiner—Annie H. Chau
Attorney, Agent, or Firm—Finnegan, Henderson, Farabow, Garrett & Dunner

[57] ABSTRACT

The invention provides a combined cap and signal device to be attached to a tire after the tire is inflated. The device includes an electric alarming unit mounted in a cap-like casing which incorporates an adaptor to be threadedly connected to an inflating valve of the tire. A resilient disc is disposed in the adaptor to be forced by air so that the disc causes the circuit of the electric alarming unit to be opened when the tire is not deflated.

2 Claims, 2 Drawing Sheets

4,814,745

SIGNAL DEVICE FOR PNEUMATIC TIRE

BACKGROUND OF THE INVENTION

This invention relates to a signal device for a pneumatic tire and particularly to a signalling cap for the inflating valve of a pneumatic tire which has an electrical sound producing unit for the purpose of alarming when the tire is deflated to a pressure below a predetermined proper pressure.

Signal devices for pneumatic tires are known in the art. Some of them are of the type which is used during inflation of the tire for the purpose of alarming when the pressure in the tire exceeds a predetermined required pressure. Some of them are used as a cap for the inflating valve of a tire as well as a signal device to signal when the pressure in the tire is seriously deflated. U.S. Pat. No. 2,334,095 discloses a signal device of the latter type which includes a cap-like casing in which is mounted a valve that permit air to enter the casing from the tire to which the casing is connected when the tire is deflated to a predetermined pressure. The casing also contains a sound making unit which has an air-tight hood member that explodes when air enters the casing. U.S. Pat. No. 1,626,294 discloses a signal device which is mounted on the inflating valve of a tire after the tire is inflated and which includes a spring loaded thimble to be used as an indicator to show the deflated pressure in the tire.

SUMMARY OF THE INVENTION

An object of the invention is to provide an improved combined cap and signal device which includes an electric sound producing unit which will alarm when the tire to which the device is attached is seriously deflated.

Another object of the invention is to provide a combined cap and signal device which has a simpler construction for actuating a sound producing unit than the other similar conventional signal devices.

The invention provides a combined cap and signal device which comprises a cap-like casing and a hollow adaptor threadedly coupled together. The hollow adaptor has a stepped portion defining an annular shoulder and an internal thread formation adjacent to the annular shoulder. A transverse partition member is formed in the adaptor and having a central finger piece axially projecting therefrom to open the inflating valve of the tire and air inlet openings.

A disc member which is made of a resilient material is secured to the annular shoulder with its annular flange. The disc member cooperates with the partition member to confine an air chamber communicated with the air inlet openings of the partition member. The disc member has a projection axially extending in a direction opposite to the finger piece. A conductive hollow screw member is inserted in the adaptor to clamp the peripheral flange of the disc member against the annular shoulder. The screw member has an external thread engaged with the internal thread of the adaptor.

An electric alarming unit is mounted in the caplike casing and has a cell means which is in contact with a coil spring which in turn is connected to a conductive plate to urge the conductive plate to contact said conductive hollow screw. The projection of the disc member pushes the conductive plate to move away from the hollow screw member when the tire is not deflated. The spring urges the conductive plate to be in contact with the hollow screw member when the tire is deflated to a predetermined reduced pressure.

The exemplary preferred embodiment will be described in detail with reference to the accompanying drawings, in which:

DETAILED DESCRIPTION OF THE PREFERRED EMBODIMENT

Figure 2:
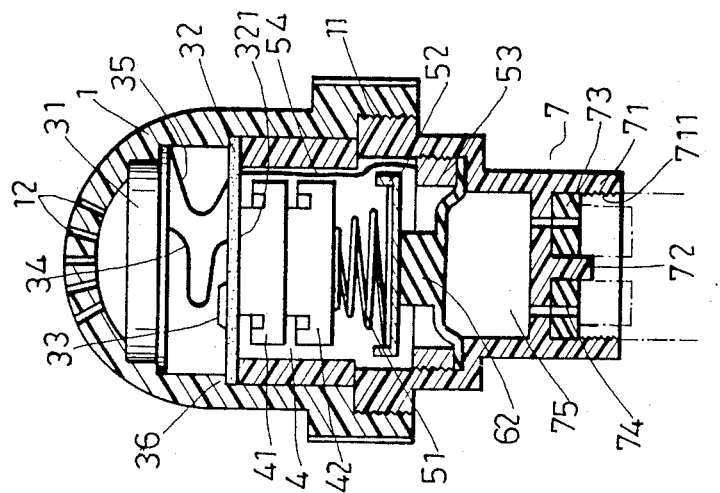
FIGS. 1 and 2 are sectional view of a combined cap and signal device according to the present invention.
Figure 1:
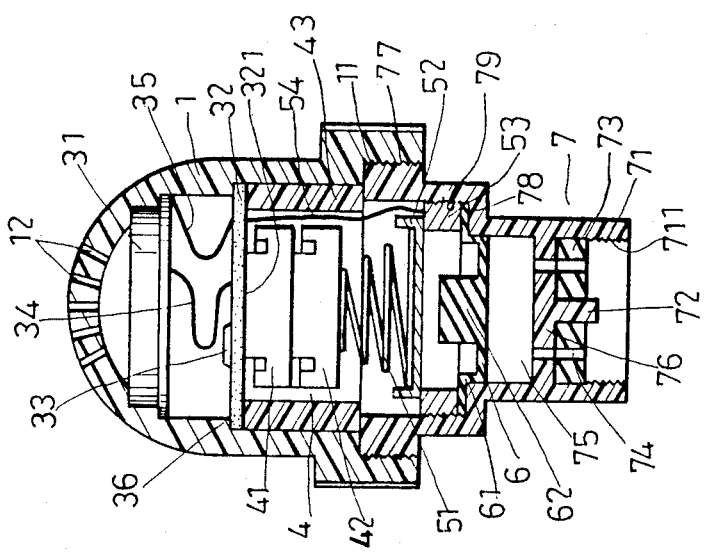
Figure 3:
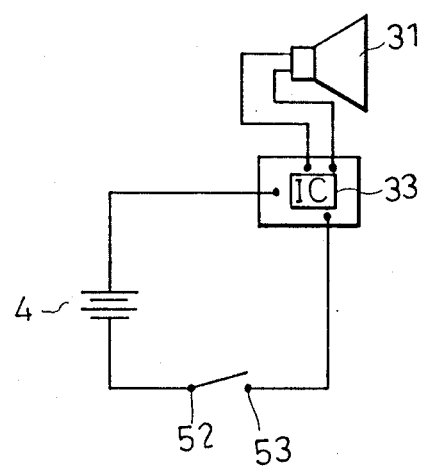
FIG. 3 is a circuit diagram of the electric alarming means of the device.

Referring to the drawings, a signal device according to the present invention is shown, having a cap-like casing 1 and a hollow adaptor 7 which are made of an electric insulating material and which are threadedly coupled together. The cap-like casing 1 has a round closed end and an open end with an internal thread 11. The hollow adaptor 7 has an open end 71 which has an internal thread 711 to be connected threadedly to an inflating valve of a tire. Another open end of the hollow adaptor 7 has an external thread 77 which engages the thread 11 of the cap-like casing 1. Adjacent to the open end 71 of the hollow adaptor 7 is a transverse partition plate 76 which has a central axially extending finger piece 72 to push the inflating valve of the tire to an open position when the adaptor 7 is mounted on the inflating valve. The partition plate 76 is further provided with air inlet openings 74. A gasket 73 is press fitted in the adaptor member and abuts with the partition plate 76. The wall of the hollow adaptor member 7 is stepped to form an annular shoulder 78 and has an internal thread 79.

In the hollow adaptor 7 is a disc member 6 which is made of a rubber material and has a peripheral flange 61 clamped by a hollow screw member 53 against the annular shoulder 78. The hollow screw member 53 is made of a conductive metal and engages with the internal thread 79 of the adaptor member 7, thereby firmly holding the disc member 6 in the adaptor 7. The disc member 6 further has a projection 62 extending axially therefrom in a direction opposite to the finger piece 72 of the partition member 76. The disc member 6 and the partition member 78 cooperate to confine an air chamber 75 which will be communicated with the interior of the tire through the inflating valve of the tire and air inlet openings 74.

An electric alarming unit is disposed adjacent to the closed end of the cap-like casing 1. It includes a buzzer 31 and a substantially circular printed circuit board 32 bearing a sound producing integrated circuit 33. The buzzer 31 includes a casing which is seated against shoulder formations 13 and 14 which are formed at the inner side of the cap-like casing 1. The printed circuit board 32 is seated on an annular shoulder 36 and is clamped thereat by a sleeve 43 which is made of an insulating material and which is inserted into the casing 1. The sleeve 43 and the board 32 confines a chamber for accommodating batteries 42. The closed end of the casing 1 is provided with openings 12 for the outlet of sound. Conductors 34 and 35 are provided to electrically interconnect the integrated circuit 33 and the buzzer 31.

The printer circuit board 32 further has a terminal 321 to be in contact with a positively charged terminal of the battery. A conductive coil spring 51 is provided to be in contact with a negatively charged terminal of the battery. The coil spring 51 is connected to a conductive plate 52 to urge the plate to contact the end of the hollow screw member 53. The hollow screw member 53 is in turn connected to another terminal of the printed circuit board 32.

When the signal device of the present invention is attached to the inflating valve of an inflated tire, the valve of the tire is opened by the finger piece 72 and the disc member 6 is pushed upward as is shown in FIG. 2. The projection 62 of the disc member 6 pushes the conductive plate 52 against the force of the spring 51 and thereby separates the conductive plate 52 and the hollow screw member 53, placing the alarming unit in an OFF position. When the tire is deflated to a predetermined reduced pressure, the conductive plate 52 is pushed by the spring 51 to be in contact with the hollow screw member 53. In this situation, the sound producing circuit 33 produces an alarming sound.

With the invention thus explained, it is apparent that numerous modifications and variations can be made without departing from the scope of the invention. It is therefore intended that the invention be limited as indicated in the appended claims.

What I claim is:

1. A combined cap and signal device for a pneumatic tire comprising:

a cap-like casing having a closed end and an open threaded end a hollow adaptor having a first threaded end engaging with said open threaded end of said casing and a second threaded end to be connected to an inflating valve of the tire, said hollow adaptor having a wall which has a stepped portion defining an annular shoulder and an internal thread formation adjacent to said annular shoulder, said hollow adaptor further having a transverse partition member formed near said second threaded end, said transverse partition member having a central finger piece axially projecting therefrom to open the inflating valve of the tire and air inlet openings, a disc member made of a resilient material and having a peripheral flange secured to said annular shoulder, said disc member cooperating with said partition member to confine an air chamber communicating with said air inlet openings, said disc member having a projection axially extending in a direction opposite to said finger piece;

a hollow screw member for securing said peripheral flange of said disc member to said annular shoulder, said hollow screw member being inserted in said adaptor to clamp said peripheral flange of said disc member against said annular shoulder and having an external thread engaging with said internal thread formation of said hollow adaptor, said hollow screw member having an annular end serving as an electrical contact surface;

an electric alarming unit mounted in said cap-like casing, said alarming unit including a sound producing circuit, and a cell means electrically connected to said sound producing circuit, first means for electrically connecting said sound producing circuit to said electrical contact surface of said hollow screw member;

second means for electrically connecting said cell means to said electrical contact surface of said hollow screw member, said means including a conductive plate member to contact said electrical contact surface, and a coil spring having one end connected to said conductive plate member and the other end electrically connected to said cell means;

said projection of said disc member pushing said conductive plate to move away from said hollow screw member when the tire is not deflated, said spring urging said conductive plate to be in contact with said hollow screw member when the tire is deflated to a predetermined reduced pressure.

2. A combined cap and signal device as claimed in claim 1, wherein said cap-like casing and said hollow adaptor are made of an insulating material.

* * * * *